United States Patent [19]

Bryant

[11] Patent Number: 5,031,390
[45] Date of Patent: Jul. 16, 1991

[54] AQUATIC HARVESTING EQUIPMENT

[76] Inventor: Charles B. Bryant, 32380 Wildwood Pt. Rd., Hartland, Wis. 53029

[21] Appl. No.: 500,369

[22] Filed: Mar. 28, 1990

[51] Int. Cl.$^5$ ............................................. A01D 44/00
[52] U.S. Cl. ...................................... 56/8; 56/DIG. 2
[58] Field of Search .................... 56/8, 9, 1, 2; 114/26; 37/71, 57

[56] References Cited

U.S. PATENT DOCUMENTS

| | | | |
|---|---|---|---|
| 2,486,275 | 10/1949 | Grinwald | 56/8 |
| 3,498,033 | 3/1970 | Huff | 56/9 |
| 3,688,478 | 9/1972 | Bryant | 56/1 |
| 4,248,033 | 2/1981 | Bryant | 56/8 |
| 4,258,534 | 3/1981 | Bryant | 56/9 |
| 4,261,160 | 4/1981 | Niewiera | 56/8 |
| 4,616,588 | 10/1986 | Caddick | 56/8 X |
| 4,696,149 | 9/1989 | Hawk | 56/8 |

Primary Examiner—Stephen J. Novosad
Attorney, Agent, or Firm—Fuller, Ryan & Hohenfeldt

[57] ABSTRACT

A semi-submersible flotsam harvesting vessel is provided which has gunwale floats and a hinged bow section and which cooperates with a floating receptacle to unload the harvest. The method of harvesting includes swamping the vessel by lifting the bow section to float the flotsam into the hold, closing the bow and energizing the motor to put the hull on plane to drain the water from the flotsam for high speed travel to the floating receptacle where the vessel is again swamped to float the flotsam into the container as the vessel withdraws with bow open.

13 Claims, 2 Drawing Sheets

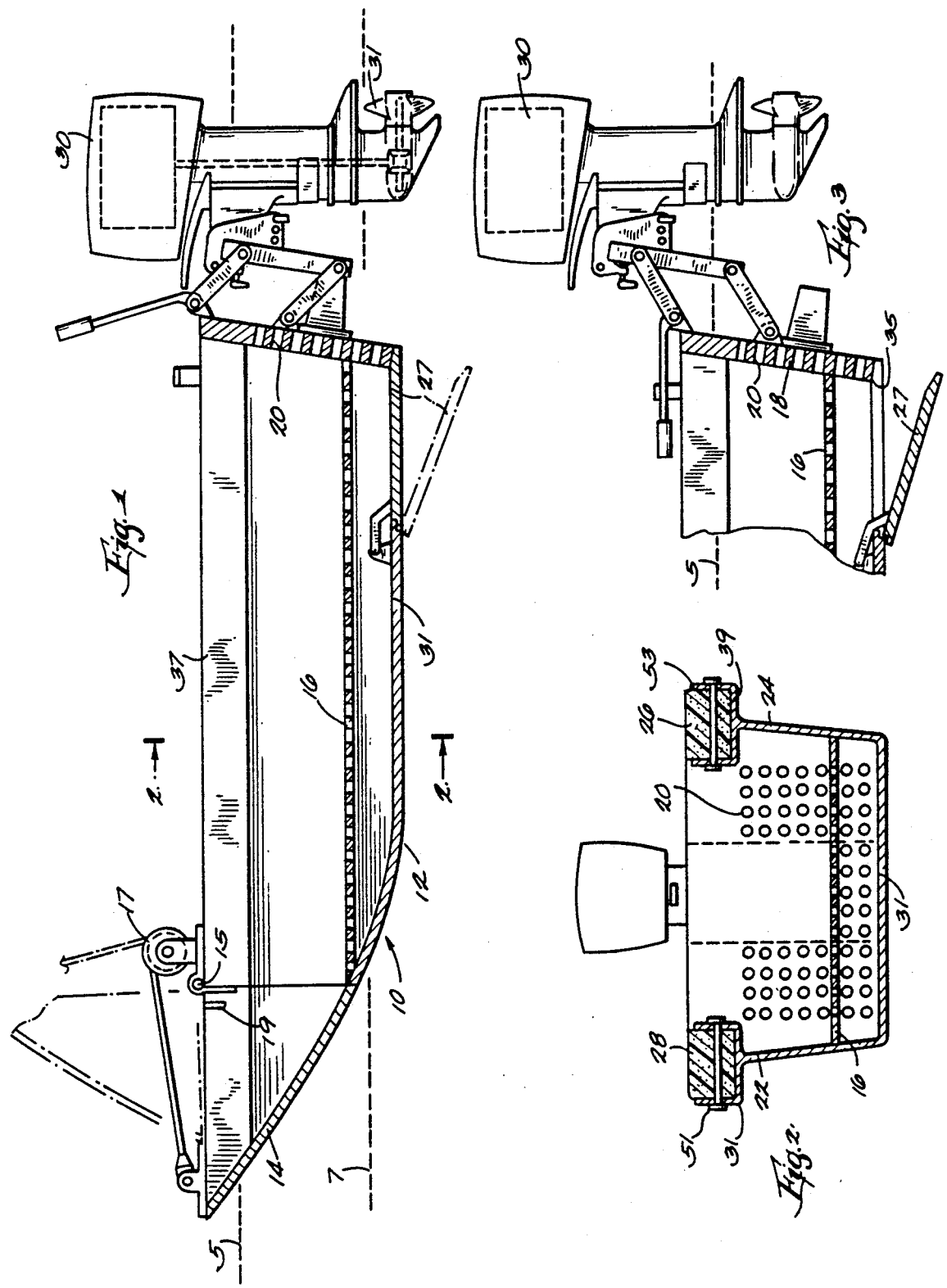

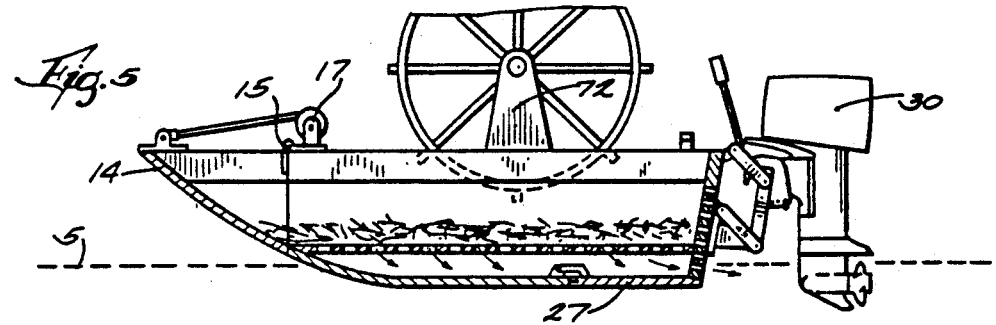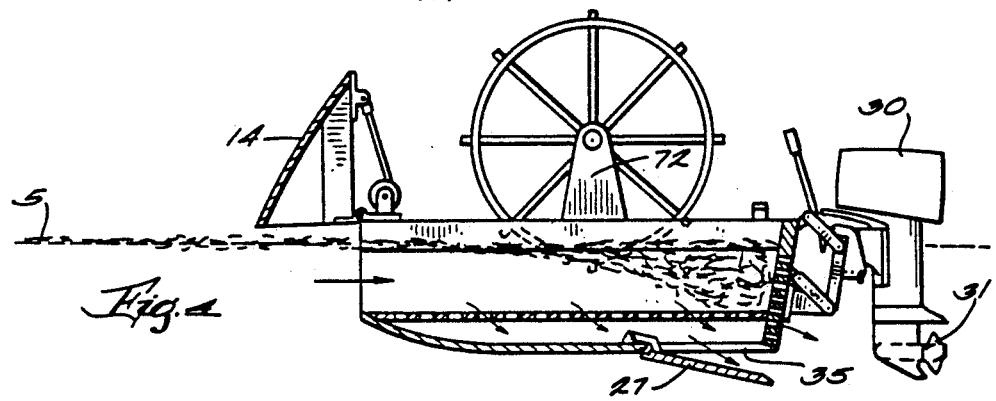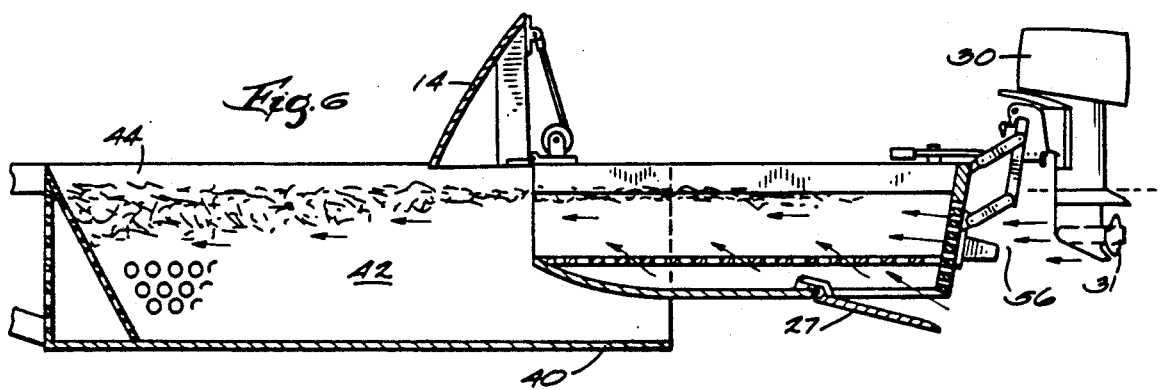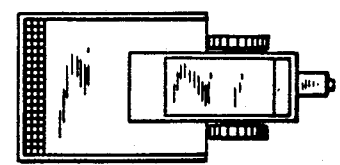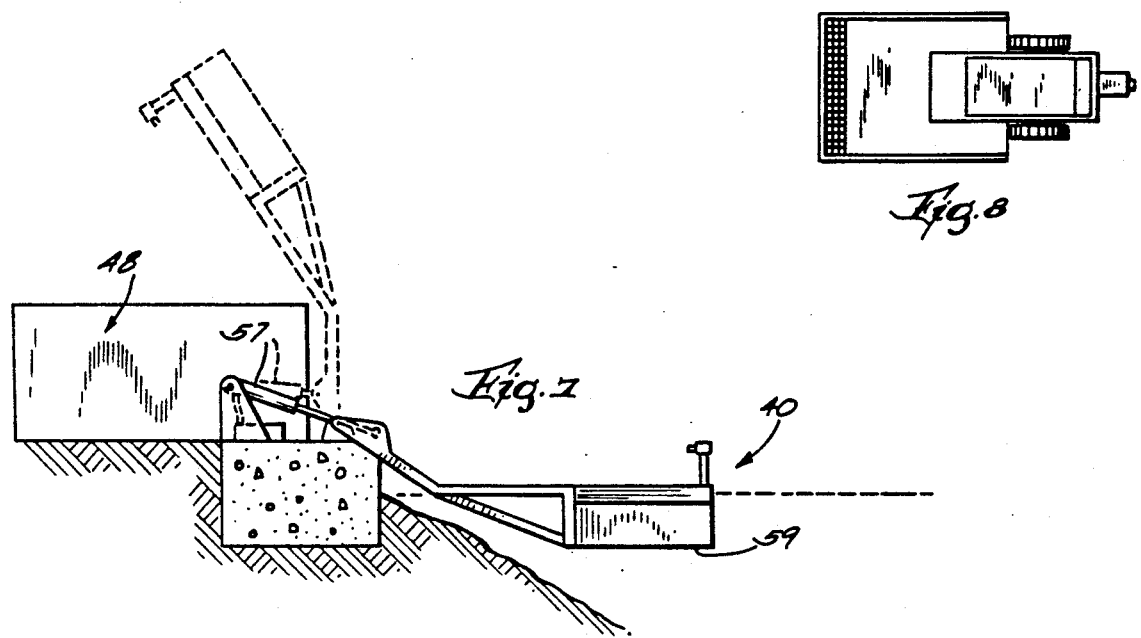

AQUATIC HARVESTING EQUIPMENT

FIELD OF THE INVENTION

The invention relates to method and apparatus for harvesting certain floating weeds or recovering flotsam from a body of water using a vessel.

BACKGROUND OF THE INVENTION

The invention is a further development and improvement of the techniques disclosed in my prior U.S. Pat. No. 4,248,033. Although the prior art method and apparatus disclosed in said patent are effective to accomplish the intended results, two very specialized pieces of equipment are involved including the plurality of collection containers, a tug boat and a harvesting vessel. Other water collection apparatus is shown in my U.S. Pat. Nos. 4,258,534 and 3,688,478.

SUMMARY OF THE INVENTION

The present invention provides a high speed vessel which is highly maneuverable and has the ability to drive under and into flotsam. After harvesting the flotsam it can be accelerated into an elevated planing mode, in which the flotsam is strained or lifted and separated from the water which floated the flotsam. This water drains through a perforated floor and moves rearwardly out a perforated transom and an opening in the bottom of the hull thus reducing the weight and volume of the water-flotsam cargo. The vessel cooperates with a floating shore receptacle to transfer flotsam or weeds from the high speed vessel to a shore transport container up on shore. The vessel is operated in a semi-submersed, swamped mode supported by floats fixed to the gunwales for cruising under and collecting the flotsam, and in an elevated planing, or transport mode for transport and water drainage of the collected flotsam.

At shore, the vessel is slowed and thus lowers into the swamped mode. Water rushes in fore and aft to fill the hold with water thereby refloating the flotsam. Then the vessel is driven into and immediately reversed out of the floating receptacle. The hull is provided with a bow section which can be remotely pivoted to an open position to lower the vessel and to enable the vessel to move under and around flotsam to channel the flotsam into the cargo hold. When the bow section is opened to convert the vessel into a harvest mode, the hold is swamped and lowers to an elevation in the water determined by the size of the partially submerged gunwale flotation. This flotation will provide enough buoyancy to maintain the hull at a lowered position or harvest mode during flotsam collection. After the hull is filled with flotsam and the bow closed, the motor is capable of accelerating the hull to a planing position to cause rapid separation of the water from the flotsam, with the water exiting the hull through a perforated transom at the stern. The hull then is supported in the water as a planing hull, rather than by the gunwale flotation.

The floating receptacle can be tiltable to dump the contents into a shore transport container for removal to a landfill site. The floating receptacle is U-shaped and open ended with spaced sidewalls with floats on each sidewall. The vessel maneuvers in between the sidewalls, opens the vessel bow and, with reversed thrust of the engine, propels the now floating flotsam from the vessel hold through the bow opening and into the floating receptacle, as the vessel backs out from the floating receptacle. The floating receptacle pivots up through an arc to dump the contents into a shore transport container.

Further objects, advantages and features of the invention will become apparent from the disclosure.

DESCRIPTION OF THE DRAWINGS

FIG. 1 is a side elevational view in fragmentary section of a vessel in accordance with the invention.

FIG. 2 is a sectional view along line 2—2 of FIG. 1.

FIG. 3 is a fragmentary view of FIG. 1 showing the motor in an elevated position for shallow water harvest.

FIG. 4 shows the collection vessel in a flotsam receiving lower mode.

FIG. 5 shows the vessel in a transport elevated mode with the boat on plane.

FIG. 6 is a diagrammatic elevational view showing the vessel about to enter the floating receptacle but with the motor in reverse.

FIG. 7 is a diagrammatic elevational view showing the dumping of the floating receptacle into a shore transport container.

FIG. 8 is a diagrammatic plan view in reduced scale of the vessel within the floating receptacle.

DESCRIPTION OF A PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, FIG. 1 shows the water line 5 on the hull of a vessel 10 when the motor is off or the vessel is in the lower harvest mode. The water line 7 is the position of the water relative to the vessel hull 12 when the vessel is in a planing mode as hereinafter described. The hull 12 has a hinged bow section 14 pivotally supported by hinge 15 mounted on an upper part 9 of the boat hull. The hinge 15 is connected to a cross brace 19 on the bow section. The bow section 14 is in an open position as shown in FIG. 4 when the vessel is in a harvest or discharge mode. As hereinafter described, a winch 17 with a cable 13 or other apparatus can be employed for lifting the bow section to the broken line position in FIG. 1. This opens the hull to form a U-shaped channel or cargo hold 23 as shown in FIG. 2.

The hull is provided with a perforated floor or grate 16 to enable separation of water from the flotsam. A transom 18 is perforated or apertured with apertures 20 to enable removal of water from the flotsam as subsequently described or to induce water flow into the hull to swamp the vessel when the vessel is coming off the planing mode or lowering into the harvest mode. The sidewalls 22 and 24 (FIG. 2) are provided with floats 26, 28 to support the vessel in the water during the lower harvest mode shown in FIG. 4. The floats are anchored in channels 37, 39 (FIG. 2) at the top of the sidewalls by cross pins through the channel flanges 51, 53. The bottom 31 (FIG. 3) of the hull is provided with a rear opening 35 having a hinged hatch cover 27 which will assist in removal of water when the vessel is accelerating as hereinafter described.

An outboard motor 30 is provided and mounted on a motor mount 32. The motor mount 32 includes two parallel links 29 pivotally connected to the transom 18 and mount board 41. The linkage can be moved from the lowered FIG. 1 position with the mount board abutting a bumper 52 to the elevated FIG. 3 position. The FIG. 3 position is utilized to direct water from reverse prop thrust into the transom during unloading of the flotsam as illustrated in FIG. 6. A handle 43 is provided for manual raising of the motor. A power cylinder could also be employed.

In FIG. 6 an open end floating receptacle 40 is shown which has a pair of spaced imperforate sidewalls 42 which are provided with floats 44 to support the floating receptacle 40 at an appropriate level in the water at shore for receiving the vessel 10 during unloading of the vessel contents. Means are provided for dumping the contents of the floating receptacle 40. In the disclosed construction a hydraulic ram 57 and pivoted boom 47 are provided to lift the floating receptacle 40 and dump the flotsam into the shore transport container 48. The side walls 42, forward sloped wall 45 and bottom wall 59 are perforated to drain the water from the flotsam as the flotsam-water cargo is lifted from the water. FIG. 8 illustrates the vessel 10 partially within the open end of the receptacle 40. The container 48 is adapted to be trucked to a remote site.

In practicing the method of the invention the vessel is employed in the FIG. 4 position with the bow open and the vessel in the swamped harvest mode to receive flotsam during movement of the vessel directly under and through the flotsam. The hull in the FIG. 4 swamped position is supported by the floats 26, 28. The rear hatch 27 also will drop open by gravity to facilitate movement through the water into the flotsam reducing any frontal wave. The rear hatch 27 can also be pivoted between open and closed positions with a power cylinder or hand lever (not shown). Preferably the hatch cover has no control. It will then function without operator attention. In the slow speed harvest mode the door or hatch 27 will hang open by gravity because of the large quantity of water moving into and through the hull. In shallow water the bottom may close the hatch. In the acceleration mode with the bow closed, the water within the hull will keep the door open until most of the water is drained from the hull. As speed increases the water beneath the planing hull will close the hatch 27 and hold it shut. When the hull slows down and the forward bow section is lifted, the hatch 27 will open.

In the load dumping mode shown in FIGS. 6 and 8 the reverse thrust of the prop will force the door open and back flush the flotsam 71 into the shore station with the motor 30 in its lowermost position.

In the harvest mode after the hold of the vessel is filled, the hull section 14 is closed and the motor speed is increased to move the boat up to a planing position as shown in FIG. 5 to cause the water to separate from the flotsam and exit the hull through the apertures 20 in the transom 18 The loaded vessel then moves to the floating receptacle 40 in the planing transport mode and opens the bow section 14 just before entry into the floating receptacle 40. This causes the vessel to again swamp. The motor is raised and reversed to propel water in the direction shown by the arrows 56 to cause movement of the flotsam forwardly as the hull withdraws from the floating receptacle 40, leaving its cargo of flotsam floating within the floating receptacle walls. As shown in FIG. 7, the floating container can then be dumped into the shore transport container 48.

In operation, the propeller 33 on the motor 30 performs various functions: accelerates the vessel out from under water entrained in the vessel 10 after the hull is filled with flotsam; the water ejects out the transom and partly through the hinged hatch cover; causes the vessel to cruise with a full load of dewatered flotsam in planing transport mode; slows down to lower the vessel from planing into the swamping harvest mode in conjunction with bow being raised to open position; slows forward motion, yet directs full harvest into the floating receptacle at shore; sequentially moving into reverse, it drives the boat to a halt and, without hesitation, backs the now swamped vessel out and from under its now floating flotsam load leaving the flotsam in the floating receptacle; full reverse thrust of the propeller jets water into the hinged hatch for back flushing; with the bow closed, the propellers get the now empty vessel again de-watered and planing back to the harvest area; after swamping, the propellers will push the harvester at slow or medium speed into the harvest and under the flotsam. The outboard drive propeller becomes a massive water pump causing incredible current flow into the bow opening along with a huge harvest intake. The grating type deck 16 under the flotsam allows water to flow through the harvest down the length of the keel and out the rear openings 20. Reverse flow assisted by the outboard drive propeller makes a rapid swamp easily accomplished; in a shallow water harvest the outboard drive propeller will be beating against the bottom of the waterway with potential damage. To deal with this the motor mount allows a raising of the prop to just above the keel. Water from the interior of the hull will feed the prop to prevent cavitation. That flow will accelerate the flow through of water and the intake of flotsam.

Power driven paddle wheels 70 can be used alternatively or in cooperation with the outboard motor. The power drive for the paddle wheels is not shown. The paddle wheels are axle mounted on brackets 72 on the gunwales and propelled by any suitable drive. The paddle wheels can be used for zero radius turns and shallow water propulsion. Additionally, reversed paddle wheel thrust can be used to consolidate flotsam around the sides of the harvester into the intake area which is useful both during harvesting and unloading. The paddles engage the water in swamped elevation only. The paddle wheels also add maneuverability for harvesting in shallow water.

A suitable boat hull for practicing the method of the invention would be a common flat bottomed, square bow John Boat of aluminum 7'×16' with 35-50 hp capacity. The transom should be 80% porous through which water inside the hull will jettison under full power acceleration. Both gunwales are equipped with permanent flotation for their full length. The flotation must be sufficient to keep the vessel fully stable, especially in the swamped condition with an operator walking on that flotation from side-to-side and end-to-end and under varying power conditions.

Although a particular vessel has been disclosed herein, various types of vessels can be employed including air boats and large sea going highpowered boats. With an air boat, paddle wheels would be required for reverse movement. Many types of flotation for the hull can be employed.

I claim:
1. A method of recovering flotsam comprising:
   the steps of providing a harvesting vessel with a planing hull having a bow opening, said vessel having an upper planing mode and a lower flotation mode with buoyant floats on the vessel supporting it in said lower mode, the vessel being adapted to intercept flotsam and collect it within the hull and said upper mode being at an elevated position with respect to the lower mode to afford drainage of water from the hull and from the flotsam and providing a floating receptacle adapted to receive the vessel in its lower mode to accept discharge of the refloated flotsam, the steps including operating the vessel in the lower mode with the bow open to receive flotsam, closing the opening in the hull and increasing motor speed to plane the hull to the upper mode to drain water from the flotsam, transporting the drained flotsam to the floating receptacle with the vessel steering into the floating receptacle and opening the bow to refloat the flotsam and discharging the flotsam into the floating receptacle while the hull withdraws from the floating receptacle while the bow is open to thereby discharge the flotsam into the receptacle.

2. The method of claim 1 wherein said vessel has openings in a transom to afford movement aft and forward of water driven by the motor propeller.

3. The method of claim 1 wherein the provided vessel has a motor with a motor mount to raise the propeller behind the transom to enhance water flow into and out of the transom and to improve shallow water operation.

4. The method of claim 1 wherein the vessel is provided with a hatch cover beneath the water level to aid in draining water from the flotsam.

5. The method of claim 1 wherein said vessel is provided with paddle wheels which engage the water when the vessel is in the lower mode.

6. A method of harvesting flotsam comprising:
capturing the flotsam and water in a harvesting vessel propelled by a motor-driven propellor, said vessel having a bow opening, a hull enclosing a perforated floor to afford drainage of water from the flotsam, said hull having a rear opening in its bottom, separating substantial amounts of the water from the flotsam by retaining said flotsam on said perforated floor and causing water to flow therethrough, transporting the partially drained flotsam, and refloating and discharging the flotsam by rotating said propellor in its reverse direction to cause water to flow into said hull through said rear opening and refloated flotsam out through said bow opening into a floating receptacle for recovery.

7. A vessel for harvesting flotsam, said vessel including a hull, a forward bow section for said hull, means for mounting said bow section for displacement from an in-line position to an elevated position to open the hull, said hull having flotation on the gunwales for supporting the hull in a lowered position in the water, means for draining water from the interior of said hull and motor means for propelling the hull in a planing mode with the floats elevated from the water.

8. A vessel in accordance with claim 7 wherein the said vessel is provided with a transom with drainage holes therein for removing substantial quantities of water inside the vessel when the hull is planing.

9. The vessel of claim 7 including a hatch located in the bottom of the vessel and sternward of the vessel to assist in draining water from the hull and means for supporting the hatch for movement between an open and closed position.

10. A vessel in accordance with claim 7 wherein said gunwales are in the form of open channels which receive the flotation which is anchored therein.

11. The vessel of claim 7 in which the means for lifting the forward bow section comprises a hinge pivotally connected to said bow section and including a lifting means for swinging said bow section about said hinge.

12. The vessel of claim 7 including a perforated grate in said hull to enable withdrawal of water to a position in said vessel beneath said grate to drain water from said flotsam.

13. The vessel of claim 7 in combination with a shore receptacle having spaced side walls, a bottom wall and a sloped perforated dumping wall, and an entrance for said vessel between said side walls to receive the vessel cargo.

* * * * *